(12) United States Patent
Otsuka et al.

(10) Patent No.: US 9,099,746 B2
(45) Date of Patent: Aug. 4, 2015

(54) ELECTRICITY STORAGE DEVICE

(75) Inventors: Yu Otsuka, Osaka (JP); Nobuhiko Hojo, Osaka (JP)

(73) Assignee: PANASONIC INTELLECTUAL PROPERTY MANAGEMENT CO, LTD., Osaka (JP)

( * ) Notice: Subject to any disclaimer, the term of this patent is extended or adjusted under 35 U.S.C. 154(b) by 23 days.

(21) Appl. No.: 14/116,953

(22) PCT Filed: Jul. 5, 2012

(86) PCT No.: PCT/JP2012/004381
§ 371 (c)(1),
(2), (4) Date: Nov. 11, 2013

(87) PCT Pub. No.: WO2013/008428
PCT Pub. Date: Jan. 17, 2013

(65) Prior Publication Data
US 2014/0065490 A1   Mar. 6, 2014

(30) Foreign Application Priority Data

Jul. 8, 2011 (JP) ................... 2011-151911
Feb. 22, 2012 (JP) ................... 2012-036122

(51) Int. Cl.
*H01M 6/16* (2006.01)
*H01M 4/60* (2006.01)
(Continued)

(52) U.S. Cl.
CPC ............. *H01M 4/606* (2013.01); *H01M 4/137* (2013.01); *H01M 4/604* (2013.01); *H01M 10/052* (2013.01); *H01M 10/0568* (2013.01); *H01M 10/0569* (2013.01); *Y02E 60/122* (2013.01)

(58) Field of Classification Search
CPC .......... H01M 10/052; H01M 10/0568; H01M 10/0569; H01M 4/137; H01M 4/604; H01M 4/606; Y02E 60/122
USPC ............. 429/306, 324, 341, 344, 207, 231.95
See application file for complete search history.

(56) References Cited

U.S. PATENT DOCUMENTS 4,343,871 A   8/1982   Tobishima et al.
6,743,877 B1  6/2004   Armand et al.
(Continued)

FOREIGN PATENT DOCUMENTS

JP   56-086466 A    7/1981
JP   2001-512526 A  8/2001
(Continued)

OTHER PUBLICATIONS

International Search Report issued in International Application No. PCT/JP2012/004381 dated Oct. 16, 2012, 2 pgs.

*Primary Examiner* — Patrick Ryan
*Assistant Examiner* — Ben Lewis
(74) *Attorney, Agent, or Firm* — McDermott Will & Emery LLP

(57) ABSTRACT

Disclosed is an electricity storage device including a first electrode (a positive electrode (20)), a second electrode (a negative electrode (21)), and a non-aqueous electrolyte solution. The first electrode contains, as an active material, an organic compound having a quinone skeleton. The second electrode has a polarity opposite to that of the first electrode. The non-aqueous electrolyte solution contains a lithium salt and a solvent represented by the following formula (1):

$$R-O(CH_2CH_2O)_n-R' \quad (1)$$

where R and R' are each independently a saturated hydrocarbon having 1 to 5 carbon atoms, and n is an integer of 2 to 6.

9 Claims, 1 Drawing Sheet

(51) Int. Cl.
*H01M 10/052* (2010.01)
*H01M 10/0568* (2010.01)
*H01M 10/0569* (2010.01)
*H01M 4/137* (2010.01)

(56) References Cited

U.S. PATENT DOCUMENTS

| | | |
|---|---|---|
| 7,163,767 B2 | 1/2007 | Kim et al. |
| 8,338,027 B2 | 12/2012 | Ohtsuka et al. |
| 8,338,028 B2 | 12/2012 | Hojo et al. |
| 2009/0286163 A1* | 11/2009 | Shin et al. ............. 429/315 |
| 2010/0047688 A1* | 2/2010 | Ohtsuka et al. ......... 429/213 |
| 2011/0143197 A1 | 6/2011 | Ohtsuka et al. |
| 2013/0004836 A1 | 1/2013 | Otsuka et al. |

FOREIGN PATENT DOCUMENTS

| | | |
|---|---|---|
| JP | 2004-079356 A | 3/2004 |
| JP | 2004-127943 A | 4/2004 |
| JP | 2006-040829 A | 2/2006 |
| JP | 2008-222559 A | 9/2008 |
| JP | 2010-073489 A | 4/2010 |
| JP | 2010-287481 A | 12/2010 |
| JP | 2012-155884 A | 8/2012 |
| WO | 2009/118989 A1 | 10/2009 |
| WO | 2009/118990 A1 | 10/2009 |
| WO | 2011/111401 A1 | 9/2011 |

* cited by examiner

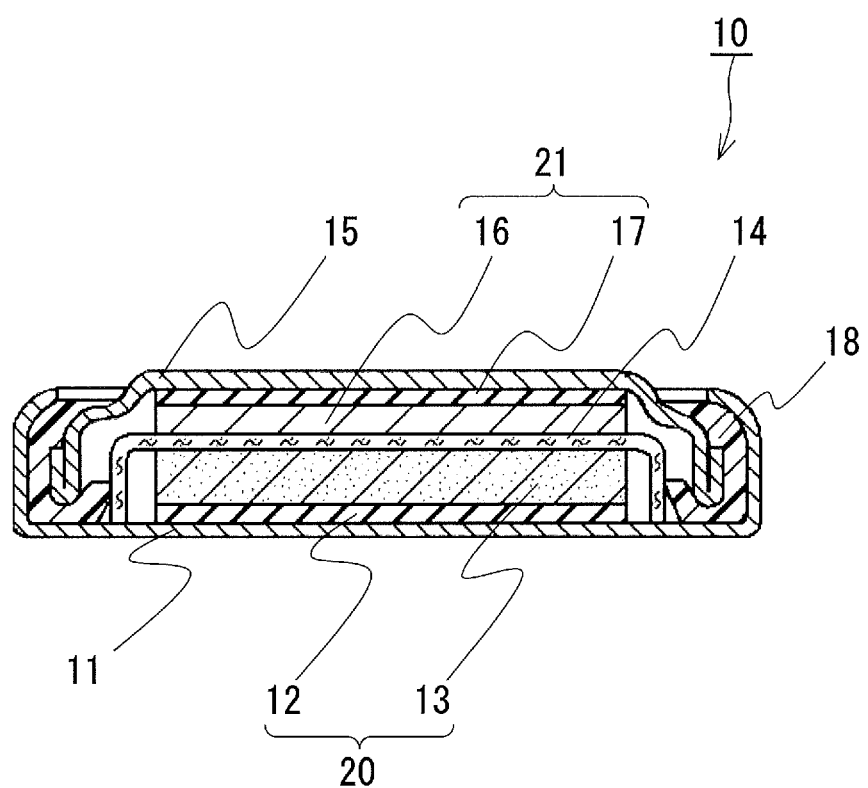

ELECTRICITY STORAGE DEVICE

RELATED APPLICATIONS

This application is the U.S. National Phase under 35 U.S.C. §371 of International Application No. PCT/JP2012/004381, filed on Jul. 5, 2012, which in turn claims the benefit of Japanese Application No. 2011-151911, filed on Jul. 8, 2011 and Japanese Application No. 2012-036122, filed Feb. 22, 2012, the disclosures of which are incorporated by reference herein.

TECHNICAL FIELD

The present invention relates to an electricity storage device.

BACKGROUND ART

With recent advances in electronic technology, portable electronic devices, such as cellular phones, portable personal computers, personal data assistances (PDAs) and portable game consoles, have been spread rapidly. Accordingly, there has been an increasing demand for electricity storage devices, such as secondary batteries, as power supplies for portable electronic devices. Among them, lithium ion secondary batteries are widely used as power supplies for portable electronic devices due to their high electromotive force and high energy density and relatively high adaptability to miniaturization.

In order to increase the versatility of portable electronic devices, they are required to provide higher performance. For example, they are required to be more lightweight, more compact, and more multifunctional. Batteries used as power supplies for such portable electronic devices are required to have higher energy densities, for example. An effective approach to increase the energy density of a battery is to use an electrode active material having a high energy density. Therefore, active research and development of novel materials having higher energy densities have been conducted for both positive and negative electrode active materials.

For example, the use of an organic compound capable of reversible redox reactions as an electrode active material has been studied. Organic compounds have specific gravities of about 1 g/cm$^3$ and are lighter in weight than inorganic oxides, such as lithium cobalt oxide, which have been conventionally used as electrode active materials. Therefore, the use of an organic compound as an electrode active material makes it possible to obtain an electricity storage device having a high weight energy density. The use of an organic compound free of heavy metals as an electrode active material also makes it possible to reduce risks of exhaustion of rare metal resources, fluctuations in the prices of such resources, environmental pollution by leakage of heavy metals, etc.

As a specific example of the use of such an organic compound, it has been proposed to use 9,10-phenanthrenequinone as a positive electrode active material and lithium ions as counter ions in a coin-type secondary battery containing a non-aqueous electrolyte solution (see Patent Literature 1). In the battery of Patent Literature 1, the positive electrode contains 9,10-phenanthrenequinone and a conductive agent such as carbon. The counter electrode to the positive electrode is made of metallic lithium. The electrolyte is made of a propylene carbonate solution in which lithium perchlorate is dissolved at a concentration of 1 mol/L.

However, 9,10-phenanthrenequinone is readily soluble in an electrolyte (liquid electrolyte). The solubility of 9,10-phenanthrenequinone greatly depends on the components and amount of the electrolyte and the configuration of the battery. Patent Literature 1 does not describe the dissolution of the positive electrode active material in the electrolyte. However, in view of the fact that the discharge capacity decreases as the number of charge-discharge cycles increases, it is considered that the dissolution of the positive electrode active material into the electrolyte is not sufficiently inhibited. For the practical use of 9,10-phenanthrenequinone as an electrode active material, it is essential to inhibit the dissolution thereof into the electrolyte.

For the purpose of inhibiting the dissolution of a phenanthrenequinone compound into an electrolyte, it has been proposed to use, as an electrode active material, a polymer compound having a phenanthrenequinone skeleton in the main chain (see Patent Literatures 2 and 3). Patent Literature 2 discloses a polymer compound obtained by polymerization of 9,10-phenanthrenequinones at their 2- and 7-positions. Patent Literature 3 discloses a polymer compound in which aromatic compounds such as a phenyl group and a thiophene group as linkers are bonded to the 2- and 7-positions or the 3- and 6 positions of 9,10-phenanthrenequinones. The use of the polymer compounds disclosed in Patent Literatures 2 and 3 as electrode active materials could help inhibit the dissolution of 9,10-phenanthrenequinone into an electrolyte without impairing the electrochemical properties of 9,10-phenanthrenequinone.

CITATION LIST

Patent Literature

Patent Literature 1: JP 56 (1981)-086466 A
Patent Literature 2: JP 2008-222559 A
Patent Literature 3: WO 2009/118989 A1
Patent Literature 4: JP 2004-079356 A
Patent Literature 5: JP 2006-040829 A
Patent Literature 6: JP 2010-073489 A
Patent Literature 7: JP 2010-287481 A

SUMMARY OF INVENTION

Technical Problem

However, for the practical use of electricity storage devices using quinone compounds such as a phenanthrenequinone compound as electrode active materials, the cycle characteristics of the devices need to be further improved. In particular, for the case where a quinone compound with reduced solubility into an electrolyte solution is used as an electrode active material, no definite findings of appropriate combinations of electrolyte salts and electrolyte solvents have been reported. It is an object of the present invention to provide an electricity storage device having a high energy density and excellent charge-discharge cycle characteristics by use of an organic compound having a quinone skeleton as an electrode active material.

Solution to Problem

The present disclosure provides an electricity storage device including: a first electrode containing, as an active material, an organic compound having a quinone skeleton; a second electrode having a polarity opposite to that of the first electrode; and a non-aqueous electrolyte solution containing a lithium salt and a solvent represented by the following formula (1):

  (1)

where R and R' are each independently a saturated hydrocarbon having 1 to 5 carbon atoms, and n is an integer of 2 to 6.

Advantageous Effects of Invention

In the electricity storage device described above, an organic compound having a quinone skeleton is used as an active material for the first electrode. Thereby, a higher energy density can be achieved. In addition, a non-aqueous electrolyte solution containing a lithium salt and a solvent represented by the following formula (1) is used. Thereby, excellent cycle characteristics can be achieved. Furthermore, the use of an organic compound having a quinone skeleton as an active material reduces the use of heavy metals or eliminates the need to use heavy metals. This makes it possible to reduce risks of fluctuations in the prices of rare metal resources by exhaustion of such resources and risks of environmental pollution by leakage of heavy metals, etc.

BRIEF DESCRIPTION OF DRAWINGS

FIG. 1 is a schematic cross-sectional view of a coin-type battery as one embodiment of an electricity storage device according to the present invention.

DESCRIPTION OF EMBODIMENTS

In the course of their research on electricity storage devices using quinone compounds as active materials, the present inventors have conducted intensive studies on the charge-discharge reaction mechanism of the quinone compounds. As a result, they have elucidated the mechanism of how the capacity of a quinone compound decreases as charge-discharge proceeds. Specifically, the present inventors have found that the combination of the molecular structure containing a quinone skeleton and the composition of an electrolyte is closely related to the cycle characteristics of the resulting electricity storage device.

A first aspect of the present disclosure provides an electricity storage device including: a first electrode containing, as an active material, an organic compound having a quinone skeleton; a second electrode having a polarity opposite to that of the first electrode; and a non-aqueous electrolyte solution containing a lithium salt and a solvent represented by the following formula (1):

$$R-O(CH_2CH_2O)_n-R' \qquad (1)$$

where R and R' are each independently a saturated hydrocarbon having 1 to 5 carbon atoms, and n is an integer of 2 to 6.

A second aspect provides the electricity storage device as set forth in the first aspect, wherein the non-aqueous electrolyte solution may further contain a chain carbonic ester. The electricity storage device using the non-aqueous electrolyte solution containing the chain carbonic ester has excellent charge-discharge performance at room and low temperatures. Since the non-aqueous electrolyte solution has excellent oxidation resistance, it exhibits high reliability even if an active material capable of providing a high voltage of about 4 V is used.

A third aspect provides the electricity storage device as set forth in the first or the second aspect, wherein in the formula (1), n may be 3 or 4. Since glycol diether represented by the formula (1) has an appropriate fluidity when n is 3 or 4, it can be advantageously used as a solvent.

A fourth aspect provides the electricity storage device as set forth in any one of the first to third aspects, wherein the non-aqueous electrolyte solution may contain 0.8 to 1.5 moles of the solvent represented by the formula (1) per mole of the lithium salt. When the non-aqueous electrolyte solution contains the lithium salt and the solvent represented by the formula (1) at such a ratio, the effect of reducing the surface charge density of the lithium salt can be obtained sufficiently.

A fifth aspect provides the electricity storage device as set forth in any one of the first to fourth aspects, wherein the lithium salt may be an imide salt. An imide salt is desirable in terms of the stability for the potential and the ionic conductivity.

A sixth aspect provides the electricity storage device as set forth in the second aspect, wherein the non-aqueous electrolyte solution may contain 1 to 10 moles of the chain carbonic ester per mole of the lithium salt.

A seventh aspect provides the electricity storage device as set forth in the second aspect, wherein the non-aqueous electrolyte solution may contain 3 to 10 moles of the chain carbonic ester per mole of the lithium salt.

When the mixing ratio of the lithium salt and the chain carbonic ester is appropriately adjusted as in the sixth and seventh aspects, the viscosity of the non-aqueous electrolyte solution can be reduced sufficiently. In addition, since the concentration of lithium is appropriately adjusted, the ionic conductivity is less likely to decrease. As a result, the non-aqueous electrolyte solution having excellent ionic conductivity can be provided.

An eighth aspect provides the electricity storage device as set forth in the first aspect, wherein a solvent component of the non-aqueous electrolyte solution may consist essentially of the solvent represented by the formula (1). Thus, the effect of reducing the surface charge density of lithium can be obtained sufficiently.

A ninth aspect provides the electricity storage device as set forth in any one of the first to ninth aspects, wherein the organic compound may be a polymer compound. Thereby, the dissolution of the organic compound in the electrolyte can be inhibited.

A tenth aspect provides the electricity storage device as set forth in any one of the first to ninth aspects, wherein the quinone skeleton may be an ortho-quinone skeleton. The reversibility in a reaction of an ortho-quinone compound is higher than that of a para-quinone compound. Therefore, in the organic compound having the quinone skeleton, the quinone skeleton is desirably an ortho-quinone compound.

An eleventh aspect provides the electricity storage device as set forth in any one of the first to tenth aspects, wherein the organic compound may be at least one selected from the group consisting of 9,10-phenanthrenequinone, a 9,10-phenanthrenequinone derivative, and a polymer compound having a 9,10-phenanthrenequinone skeleton in a main chain or a side chain. The use of any of these compounds makes it possible to obtain an electricity storage device having good cycle characteristics.

A twelfth aspect provides the electricity storage device as set forth in any one of the first to tenth aspects, wherein the organic compound may be at least one selected from the group consisting of 4,5,9,10-pyrenetetraone, a 4,5,9,10-pyrenetetraone derivative, and a polymer compound having a 4,5,9,10-pyrenetetraone skeleton in a main chain or a side chain. The use of any of these compounds makes it possible to obtain an electricity storage device having good cycle characteristics.

Hereinafter, embodiments of the present invention are described in detail.

First, a reaction mechanism in the case where an ortho-quinone compound is used as an electrode active material is described based on the following formulae (2A) and (2B). An oxidation-reduction reaction between the ortho-quinone compound and lithium ions is a two-step reaction represented by the following formulae (2A) and (2B).

[Chemical Formula 1]

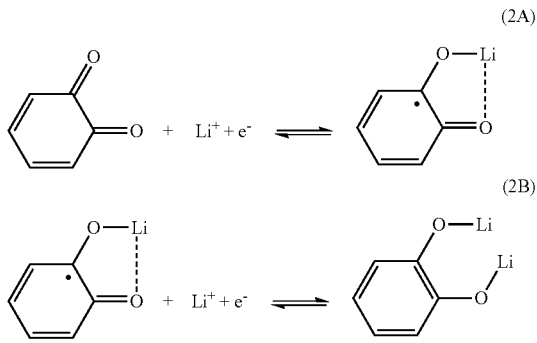

In the ortho-quinone compound, two ketone groups are adjacent to each other, and the distribution of the negative charge of the ketone groups is somewhat delocalized compared to that in a para-quinone compound. Thus, in the ortho-quinone compound, the strength of the bond formed between the ketone groups and the lithium ions through a reduction reaction is lower than that of the very strong bond like a covalent bond in the para-quinone compound. In the para-quinone compound with the localized charge distribution, one ketone group is always bonded to one lithium ion on a one-to-one basis. In contrast, in the case of the ortho-quinone compound, two ketone groups and one lithium ion are bonded together in the first step (one-electron) reaction represented by the formula (A2), and one lithium ion is bonded to each of the two ketone groups in the second step (two-electron) reaction represented by the formula (2B).

That is, the bonds between the ketone groups and the lithium ions are not one-to-one bonding between one ketone group with localized negative charge and one lithium ion, but two-to-two bonding between two ketone groups with delocalized negative charge and two lithium ions. As a result, the bond strength between the ketone groups and the lithium ions is reduced. In this way, in the ortho-quinone compound, the bond strength between the lithium ions and the ketone groups is reduced and thereby the reaction reversibility is enhanced, compared to those in the para-quinone compound.

Even if an electricity storage device using an ortho-quinone compound as an electrode active material is subjected to several cycles of charge and discharge in a charge-discharge test, no significant deterioration of the cycle characteristics is observed. However, when the electricity storage device is subjected to about 50 or more cycles of the charge-discharge reaction, the cycle characteristics may deteriorate depending on the composition of the electrolyte solution, the configuration of the electricity storage device, etc. As a result of the analysis of the deterioration mechanism, it was found that the reversibility of the charge-discharge reaction decreases particularly in the second-step reaction (2B), which may result in the deterioration of the cycle characteristics.

The present inventors presume that the cycle characteristics deteriorate by the following mechanism. As described above, in the first-step reaction (2A), two negatively polarized ketone groups and one positively charged lithium ion form a bond. On the other hand, in the second-step reaction (2B), one negatively polarized ketone group and one positively charged lithium ion form a bond. Thus, this bond is formed by a stronger Coulomb force than in the bond formed in the first-step reaction (2A). When charge-discharge is performed, coordination of lithium ions to ketone sites and desorption of lithium ions from the ketone sites are reversibly repeated. However, in some cases, lithium ions become less likely to be desorbed from the ketone sites as the number of cycles of charge and discharge increases, depending on the composition of the electrolyte solution, the configuration of the electricity storage device, etc. As a result, the lithium ions coordinated to the ketone sites accumulate, causing a decrease in the discharge capacity.

From this result, it is believed that the use of an electrolyte solution capable of weakening the one-to-one bond between the ketone group and the lithium formed in the second-step reaction (2B) makes it possible to obtain an electricity storage device having excellent cycle characteristics.

Specifically, the use of a non-aqueous electrolyte solution containing a lithium salt and a solvent represented by the following formula (1) makes it possible to improve the reversibility of the reaction not only in the first step but also in the second step. The solvent represented by the formula (1) belongs to the group of compounds called glycol diethers or glymes. A glycol diether can be a symmetrical or asymmetrical, low molecular weight ether.

In the formula (1), R and R' are each independently a saturated hydrocarbon having 1 to 5 carbon atoms, and n is an integer of 2 to 6.

A mechanism in which the use of a non-aqueous electrolyte solution containing a glycol diether solvent and a lithium salt dissolved in the solvent provides excellent cycle characteristics is described. In the case of the ortho-quinone compound, one lithium ion and one ketone group form a bond in the second-step reaction (2B). Therefore, a stronger and more stable Li—O bond is formed than that in the first-step reaction (2A), and thus an oxidation reaction from Li—O into a C=O group is unlikely to proceed during the subsequent charge. This is the cause of the capacity decrease during long-term charge-discharge cycling. So, an electrolyte solution containing a glycol diether solvent capable of exerting high coordination ability on lithium ions is used to reduce the surface charge density of the lithium ions in appearance, so as to cause the lithium ions with reduced surface charge density and ketone groups to form bonds by a discharge reaction. As a result, a more dissociable bond than the one-to-one bond between lithium and ketone is formed and the reversibility of the charge-discharge cycles is enhanced.

The following formula (3A) shows a lithium ion and a glycol diether (with n=4) coordinated to the lithium ion. The following formula (3B) shows a lithium ion and a glycol diether (with n=3) coordinated to the lithium ion.

[Chemical Formula 2]

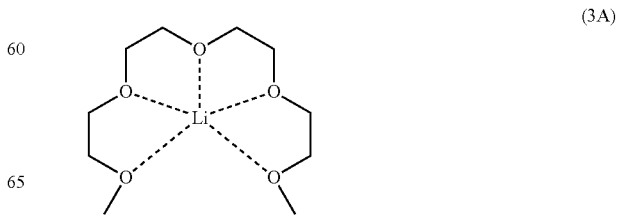

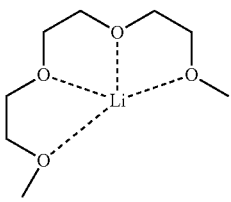
(3B)

In order to improve the long-term cycle characteristics, it is important to reduce the surface charge density of lithium. In order to reduce the surface charge density of lithium, it is necessary that any molecule is coordinated to lithium to increase the ionic radius of the molecule-coordinated lithium to some degree. However, if the ionic radius is too large, the mobility of lithium in an electrolyte solution decreases, which makes it difficult to achieve charge-discharge characteristics good enough for practical use. Even if a solvent capable of providing charge-discharge characteristics good enough for practical use is used, lithium solvated by the solvent must be in a state in which it can react with quinone smoothly. For example, in the case where a plurality of solvent molecules are coordinated to lithium, a competitive reaction occurs between the formation of a bond of a ketone site and lithium and the desolvation of lithium. For example, it is known that five ethylene carbonate molecules are coordinated to one lithium. If even one of the five molecules is desolvated, the surface charge density of lithium changes significantly. That is, the surface charge density of lithium increases. Lithium with a high surface charge density is firmly bonded to a ketone site, and as a result, excellent cycle characteristics cannot be expected.

On the other hands, one glycol diether molecule includes two or more ether bonds. Thus, one glycol diether molecule allows two or more oxygen atoms therein to be coordinated to lithium. Therefore, when lithium is present in the electrolyte solution, the two or more oxygen atoms of one glycol diether molecule are coordinated to lithium. During a reduction reaction, lithium thus coordinated by this glycol diether and a ketone site form a bond. In this case, unlike lithium coordinated by two or more molecules, lithium coordinated by a glycol diether can be coordinated to the ketone site without a significant change in the surface charge density thereof. The reasons for this are not completely clear, but the present inventors think as follows.

Presumably, even in the discharged state in which lithium and a ketone site form a bond, a glycol diether is coordinated to lithium very weakly or at least one oxygen atom of the glycol diether is coordinated to lithium. Thus, the lithium in a state in which the surface charge density is reduced in appearance (in a readily dissociable state) is bonded to the ketone site. During a charge reaction, the glycol diether is present near the ketone site. In the case where the ketone site is oxidized by the charge reaction, lithium is coordinated by the glycol diether instantaneously. Accordingly, also in the charge reaction, the lithium is coordinated by the glycol diether without a significant change in the surface charge density from the state in which the lithium has formed a bond with the ketone.

It is desirable that the glycol diether have four or five ether bonds per molecule, in view of its coordination ability to lithium. This means that n is desirably 3 or 4 in the above formula (1). When n is 3 or 4, the glycol diether represented by the formula (1) has an appropriate fluidity and thus can be advantageously used as a solvent.

When n is 3 in the formula (1), the substance of the formula (1) is called "triglyme". When n is 4 in the formula (1), the substance of the formula (1) is called "tetraglyme". A solvent of at least one glyme selected from triglyme and tetraglyme is coordinated to lithium to form a complex. Thereby, the oxidation resistance inherent in the glyme solvent can be improved. The formula (3A) shows a lithium ion and a tetraglyme coordinated to the lithium ion. The formula (3B) shows a lithium ion and a triglyme coordinated to the lithium ion.

The non-aqueous electrolyte solution may contain a chain carbonic ester as a third component, in addition to the glyme solvent and the lithium salt. Thereby, the electrolyte solution can have both high oxidation resistance and high ionic conductivity. The dielectric constants of chain carbonic esters are about 2 to 3, which are significantly lower than the dielectric constant of the glyme solvent (about 10). Therefore, the chain carbonic ester does not break the complex structure of the glyme solvent and the lithium ion. Thus, the complex structure is stabilized. Thereby, the oxidation resistance of the electrolyte solution is improved. Furthermore, since the viscosity of the chain carbonic ester is low, the addition of such a chain carbonic ester to the non-aqueous electrolyte solution reduces the viscosity of the non-aqueous electrolyte solution. As a result, the complex of the glyme solvent and the lithium ion readily diffuses, which increases the ionic conductivity of the electrolyte solution. In particular, the ionic conductivity is significantly increased at room temperature and low temperatures of 0° C. or below.

On the other hand, the use of a cyclic carbonic ester as a third component may cause a decrease in the oxidation resistance, although the ionic conductivity is increased. The dielectric constants of typical cyclic carbonic esters, propylene carbonate (PC) and ethylene carbonate (EC) are about 60 and 90, respectively. These values are much higher than the dielectric constant of the glyme solvent, i.e., about 10. Therefore, the cyclic carbonic ester is preferentially coordinated to a lithium ion, which inhibits the formation of the complex structure between the glyme solvent and the lithium ion. Thus, a free glyme solvent is generated in the non-aqueous electrolyte solution, and the glyme solvent is readily oxidized and the oxidation resistance decreases. Therefore, a chain carbonic ester is desirable as the third component.

Examples of the lithium salt contained in the non-aqueous electrolyte solution include: fluorine-containing compound salts such as hexafluorophosphate ($PF^{6-}$) and tetrafluoroborate ($BF^{4-}$); perchlorate ($ClO^{4-}$); and imide salts such as bis(trifluoromethylsulfonyl)imide ($N(SO_2CF_3)^{2-}$), bis(perfluoroethylsulfonyl)imide ($N(SO_2C_2F_5)^{2-}$), and bis(fluoromethylsulfonyl)imide ($N(SO_2F)^{2-}$). It is preferable to use an imide salt from the viewpoints of the stability for the potential and the ionic conductivity.

The mixing ratio of the lithium salt and the glyme solvent can be determined in view of the coordination number of the glyme solvent to the lithium salt. For example, the non-aqueous electrolyte solution contains 0.8 to 1.5 moles of the glyme solvent per mole of the lithium salt. Preferably, the non-aqueous electrolyte solution contains 0.85 to 1.25 moles of the glyme solvent per mole of the lithium salt. When the mixing ratio of the lithium salt and the glyme solvent is appropriately adjusted, the lithium salt can be dissociated sufficiently. The generation of a free glyme solvent that is not coordinated to lithium is prevented. As a result, a non-aqueous electrolyte solution having excellent ionic conductivity and oxidation resistance can be provided.

The mixing ratio of the lithium salt and the chain carbonic ester is not particularly limited. Preferably, the non-aqueous electrolyte solution contains 1 to 10 moles of the chain carbonic ester per mole of the lithium salt, more preferably, the non-aqueous electrolyte solution contains 3 to 10 moles of the chain carbonic ester, and further preferably, the non-aqueous electrolyte solution contains 3 to 5 moles of the chain carbonic ester. When the mixing ratio of the lithium salt and the chain carbonic ester is appropriately adjusted, the viscosity of the non-aqueous electrolyte solution can be reduced sufficiently. In addition, since the concentration of lithium is appropriately adjusted, the ionic conductivity is less likely to decrease. As a result, a non-aqueous electrolyte solution having excellent ionic conductivity can be provided.

From the viewpoint of reducing the viscosity of the non-aqueous electrolyte solution efficiently, it is preferable to use a straight chain carbonic ester as the chain carbonic ester. As used herein, the term "straight chain" refers to a linear, unbranched structure of a main skeleton consisting of carbon and oxygen atoms. Preferably, the number of carbon atoms of the chain carbonic ester is 10 or less. This is because a chain carbonic ester having 10 or less carbon atoms has a small molecular weight and a weak intermolecular force, and is effective in reducing the viscosity of the non-aqueous electrolyte solution. As such a chain carbonic ester, ethyl methyl carbonate, dimethyl carbonate, diethyl carbonate, or any of these carbonates in which one or some of alkyl groups are substituted by halogen can be used.

Next, electrode active materials that can be suitably used in the electricity storage device of the present embodiment are described.

The effect of enhancing the reversibility of the reaction by reducing the surface charge density of lithium can be obtained not only from ortho-quinone compounds but also from para-quinone compounds. Therefore, a para-quinone compound can also be used as an electrode active material for the electricity storage device of the present invention. In the para-quinone compound, however, two ketone groups are apart from each other. Therefore, the potential of the first step reaction of the para-quinone compound is as high as 2 to 3 V (with respect to lithium), but the potential of the second step reaction is as low as about 1.0 V (with respect to lithium). As a result, the voltage of the electricity storage device using the para-quinone compound drops significantly, which makes it difficult to use the second step reaction in some applications. In the para-quinone compound, two ketone groups are apart from each other, and thus the charge distribution is localized. Therefore, the reversibility in a reaction of the para-quinone compound is lower than that of the ortho-quinone compound. Thus, the ortho-quinone compound is suitable for use as an electrode active material having a quinone skeleton. That is, in the organic compound having a quinone skeleton, the quinone skeleton is preferably an ortho-quinone skeleton.

In this description, the ortho-quinone compound refers to a quinone compound having two ketone groups formed of adjacent two carbons in the molecule. As the ortho-quinone compound, a compound represented by the following formula (4) can be used.

[Chemical Formula 3]

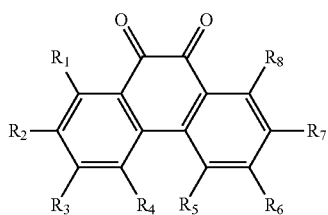

(4)

In the formula (4), $R_1$ to $R_8$ are each independently a hydrogen atom, a halogen atom such as a fluorine atom, a cyano group, an alkyl group having 1 to 4 carbon atoms, an alkenyl group having 2 to 4 carbon atoms, a cycloalkyl group having 3 to 6 carbon atoms, a cycloalkenyl group having 3 to 6 carbon atoms, an aryl group, or an aralkyl group. Each of the groups denoted as $R_1$ to $R_8$ may have, as a substituent, a group containing at least one atom selected from the group consisting of a fluorine atom, a nitrogen atom, an oxygen atom, a sulfur atom, and a silicon atom.

The compound represented by the formula (4) is 9,10-phenanthrenequinone or a derivative thereof. An organic compound having the basic skeleton of 9,10-phenanthrenequinone (9,10-phenanthrenequinone skeleton) in the molecule can be suitably used as an electrode active material unless $R_1$ to $R_8$ have a significant influence on the charge-discharge reaction. The compound represented by the formula (4) may form a polymer. In this case, arbitrary one or two of $R_1$ to $R_8$ can form a bond with the adjacent molecule, for example, the adjacent quinone skeleton or appropriate linker. As described above, as the organic compound having a quinone skeleton, at least one selected from the group consisting of 9,10-phenanthrenequinone, a 9,10-phenanthrenequinone derivative, and a polymer compound having a 9,10-phenanthrenequinone skeleton in the main chain or the side chain can be used.

As an ortho-quinone compound having three adjacent ketone groups in the molecule, a compound (so-called a triketone compound) represented by the following formula (5) can be used.

[Chemical Formula 4]

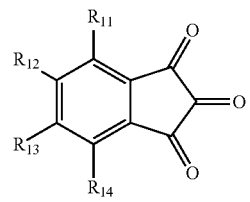

(5)

In the formula (5), $R_{11}$ to $R_{14}$ are each independently a hydrogen atom, a halogen atom, a cyano group, an optionally substituted phenyl group, an optionally substituted heterocyclic group, or an optionally substituted hydrocarbon group having 1 to 4 carbon atoms. As the halogen atom, a fluorine is preferable from the viewpoint of the molecular weight. Examples of the heterocyclic group include residues of 5-membered or 6-membered heterocyclic compounds containing sulfur as a heteroatom. The compound represented by the formula (5) also can form a polymer. In this case, arbitrary one or two of $R_{11}$ to $R_{14}$ can form a bond with the adjacent molecule, for example, the adjacent quinone skeleton or appropriate linker.

As an ortho-quinone compound having four ketone groups in the molecule, a compound represented by the following formula (6) can be used.

[Chemical Formula 5]

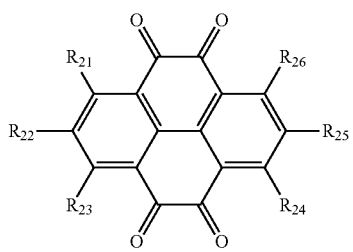

(6)

In the formula (6), $R_{21}$ to $R_{26}$ are each independently a hydrogen atom, a halogen atom, a cyano group, an optionally substituted phenyl group, an optionally substituted heterocyclic group, or an optionally substituted hydrocarbon group having 1 to 4 carbon atoms. As the halogen atom, a fluorine is preferable from the viewpoint of the molecular weight. Examples of the heterocyclic group include residues of 5-membered or 6-membered heterocyclic compounds containing sulfur as a heteroatom. The compound represented by the formula (6) also can form a polymer.

The compound represented by the formula (6) is 4,5,9,10-pyrenetetraone or a derivative thereof. An organic compound having the basic skeleton of 4,5,9,10-pyrenetetraone (4,5,9,10-pyrenetetraone skeleton) in the molecule can be suitably used as an electrode active material unless $R_{21}$ to $R_{26}$ have a significant influence on the charge-discharge reaction. The compound represented by the formula (6) may form a polymer. In this case, arbitrary one or two of $R_{21}$ to $R_{26}$ can form a bond with the adjacent molecule, for example, the adjacent quinone skeleton or appropriate linker. As described above, as the organic compound having a quinone skeleton, at least one selected from the group consisting of 4,5,9,10-pyrenetetraone, a 4,5,9,10-pyrenetetraone derivative, and a polymer compound having a 4,5,9,10-pyrenetetraone skeleton in the main chain or the side chain can be used.

Preferably, the quinone compound as an electrode active material is a polymer compound. Thereby, dissolution of the electrode active material into the electrolyte can be inhibited. In the case where the electrolyte solution contains a glyme solvent, the glyme solvent is coordinated to a lithium ion so as to form a complex structure. In this case, the size of a cation increases in appearance, which may promote the dissolution of the organic compound into the electrolyte solution. Therefore, it is recommended to use a polymer compound that is poorly soluble in the electrolyte solution as an electrode active material.

In particular, a polymer compound formed of reactive sites having a quinone skeleton and linkers that do not contribute to an oxidation-reduction reaction can be suitably used as an electrode active material. The linker can be located between the reactive sites. The presence of the linkers suppresses a decrease in the number of reaction electrons due to electronic repulsion between the reactive sites. Thereby, the energy density of the electricity storage device can be increased.

The weight average molecular weight of the polymer compound used as an electrode active material is, for example, about 500 to 100000. When the compound has a weight average molecular weight of about 1500 or more, the effect of inhibiting the dissolution thereof into the electrolyte can be obtained sufficiently.

Examples of the ortho-quinone compound having two ketone groups in the repeating unit include polymer compounds represented by the following formulae (7) to (10). In the formulae (7) to (10), n and m are each an integer indicating the number of repeating units. In the formula (10), a symbol * indicates a bond between a repeating unit and another repeating unit.

[Chemical Formula 6]

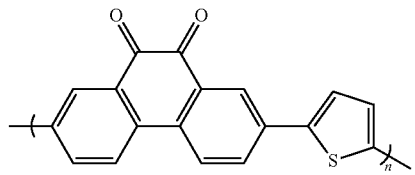

(7)

[Chemical Formula 7]

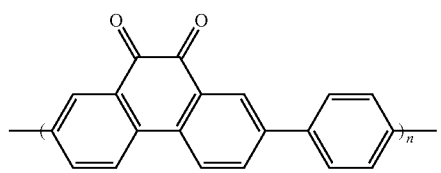

(8)

[Chemical Formula 8]

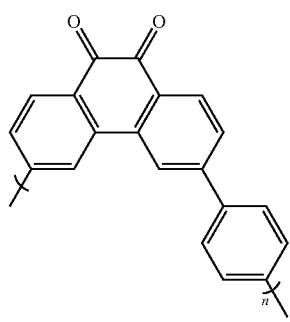

(9)

[Chemical Formula 9]

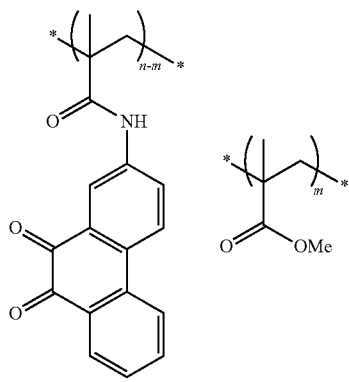

(10)

As shown in the formulae (7) to (10), the quinone skeleton may form the main chain of the polymer compound or the side chain thereof.

Examples of the tetraketone compound having four ketone groups in the repeating unit include a polymer compound represented by the following formula (11). n and m are each an integer indicating the number of repeating units. In the formula (11), a symbol * indicates a bond between a repeating unit and another repeating unit.

[Chemical Formula 10]

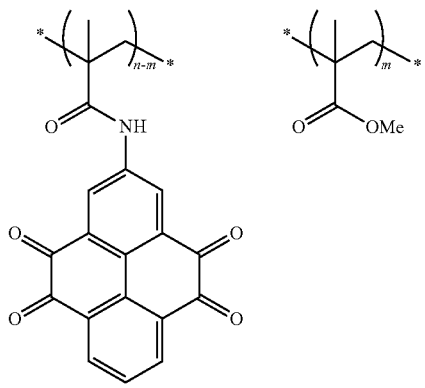

(11)

The polymer compound having a repeating unit containing a quinone skeleton and a repeating unit not containing a quinone skeleton (a linker) may be any one of a block copolymer, an alternating copolymer, and a random copolymer.

The electrode active material having a repeating unit containing a quinone skeleton is synthesized, for example, in the following manner. First, a protecting group is introduced into a ketone site, serving as a reactive site, of a quinone compound. Examples of the protecting group include trimethylsilyl (TMS), triethylsilyl (TES), tert-butyldimethylsilyl (TBS or TBDMS), triisopropylsilyl (TIPS), and tert-butyldiphenylsilyl (TBDPS). Then, a boronic acid group is introduced into the quinone compound into which the protecting group has been introduced. More specifically, the boronic acid is introduced into a site to be bonded to a linker.

On the other hand, a halogen such as iodine is introduced into a compound serving as the linker. More specifically, the halogen is introduced into a site to be bonded to the quinone compound. Then, the quinone compound and the linker compound are coupled in the presence of a palladium catalyst. Then, the protecting group is eliminated. Thus, the electrode active material having a repeating unit containing a quinone skeleton is obtained.

There is another method of synthesizing the electrode active material having a repeating unit containing a quinone skeleton. First, the para position of the compound serving as a linker is substituted by iodine to obtain an iodine compound. Next, a part of the quinone compound serving as a reactive site is substituted by a boronic acid group or the like to obtain an organic boron compound. The organic boron compound having a boronic acid group can be obtained by reacting the quinone compound, serving as a reactive site and having iodine as a substituent, with tert-butyllithium, 2-isopropyl-4,4,5-tetramethyl-[1,3,2]dioxaborolane, or the like.

Furthermore, the iodine compound and the organic boron compound are cross-coupled. Thus, the electrode active material having a repeating unit containing a quinone skeleton is obtained. The cross-coupling is carried out, for example, in accordance with Suzuki-Miyaura cross-coupling, in the presence of a palladium catalyst.

The latter method is desirable as the method for synthesizing the electrode active material in view of the facts that the latter method requires a fewer number of synthesis steps, the reaction is simple, and a higher purity compound is obtained as a synthesized material.

The synthesis reaction is performed in an inert atmosphere such as an argon atmosphere or in a non-oxidizing atmosphere. The target material obtained in each step is subjected to common isolation or purification treatment such as filtration, centrifugation, extraction, chromatography, concentration, recrystallization, and washing. Thus, the electrode active material can be easily isolated from the resulting final reaction mixture.

Depending on the synthesis method used, a mixture of a plurality of polymers having different repeating numbers n may be obtained. For such a mixture, the average repeating number, i.e., the average degree of polymerization is determined in accordance with the content ratio of the polymers having different repeating numbers. The average repeating number may be a decimal, rather than an integer, as with conventionally known polymer mixtures.

Next, one example of the configuration of the electricity storage device of the present invention is described. FIG. 1 is a schematic cross-sectional view of a coin-type battery as one embodiment of the electricity storage device.

As shown in FIG. 1, a coin-type battery 10 includes a positive electrode 20 (a first electrode or a second electrode), a negative electrode 21 (a second electrode or a first electrode), a separator 14 disposed between the positive electrode 20 and the negative electrode 21, and a non-aqueous electrolyte (a non-aqueous electrolyte solution). The battery 10 further includes a case 11, a sealing plate 15, and a gasket 18. An electrode group composed of the positive electrode 20, the negative electrode 21, and the separator 14 is placed in the case 11. The case 11 is sealed with the gasket 18 and the sealing plate 15.

One of the positive electrode 20 and the negative electrode 21 contains a quinone compound as an electrode active material. In the case where the quinone compound is used in one of the positive electrode 20 and the negative electrode 21, a conventionally used electrode active material can be used in the other electrode.

The positive electrode 20 includes a positive electrode current collector 12 and a positive electrode active material layer 13 formed on the positive electrode current collector 12. The positive electrode active material layer 13 is in contact with the separator 14.

As the positive electrode current collector 12, a porous or nonporous sheet or film made of a metallic material such as aluminum, stainless steel or aluminum alloy can be used. As the sheet or film, a metal foil, a metal mesh or the like is used. A carbon material, such as carbon, may be applied to the surface of the positive electrode current collector 12 in order to reduce the resistance, provide a catalytic effect, and strengthen the bond between the positive electrode active material layer 13 and the positive electrode current collector 12 by bonding chemically or physically the positive electrode active material layer 13 to the positive electrode current collector 12.

The positive electrode active material layer 13 is provided on at least one surface of the positive electrode current collector 12. The positive electrode active material layer 13 contains a positive electrode active material, and may contain, as needed, an electron conductive agent, an ion conductive agent, a binder, etc.

The positive electrode active material layer 13 can be formed by applying a positive electrode mixture slurry to the surface of the positive electrode current collector 12 and then drying and rolling the coating of the slurry. The positive electrode mixture slurry can be prepared by dissolving or dispersing a positive electrode active material and, as needed, an electron conductive agent, an ion conductive agent, a binder, a thickener, etc. in an organic solvent.

In the case where a quinone compound is used as the positive electrode active material (a first active material), a material capable of absorbing and desorbing lithium ions, for example, is used as the negative electrode active material (a second active material). Examples of the material capable of absorbing and desorbing lithium ions include: carbon materials such as carbon, graphitized carbon (graphite), and amorphous carbon; lithium metal; lithium compounds such as lithium-containing composite nitrides and lithium-containing titanium oxides; Si; Si compounds such as Si oxides and Si alloys; Sn; and Sn compounds such as Sn oxides and Sn alloys. The negative electrode active material may be a mixture of these materials.

It is preferable to configure the electricity storage device using a quinone compound as the positive electrode active material, using a material capable of absorbing and desorbing lithium ions, as the negative electrode active material, and using a non-aqueous electrolyte containing a polyether solvent (a glycol diether solvent) and a lithium salt composed of a lithium cation and an anion, as the electrolyte.

The electron conductive agent and the ion conductive agent are used to reduce the electrode resistance. Examples of the electron conductive agent include carbon materials such as carbon black, graphite and acetylene black, and electrically conductive polymer compounds such as polyaniline, polypyrrole and polythiophene. Examples of the ion conductive agent include gel electrolytes such as polymethyl methacrylate, and solid electrolytes such as polyethylene oxide.

The binder is used to, for example, enhance the binding property of the materials forming the electrodes. Examples of the binder include polyvinylidene fluoride, vinylidene fluoride-hexafluoropropylene copolymer, vinylidene fluoride-tetrafluoroethylene copolymer, polytetrafluoroethylene, styrene-butadiene copolymer rubber, polypropylene, polyethylene, and polyimide.

The negative electrode 21 includes a negative electrode current collector 17 and a negative electrode active material layer 16 formed on the negative electrode current collector 17. The negative electrode active material layer 16 is in contact with the separator 14.

As the negative electrode current collector 17, a porous or nonporous sheet or film made of the metallic material described for the positive electrode current collector 12, or of another metallic material such as copper, nickel, copper alloy or nickel alloy can be used. A carbon material may be applied to the surface of the negative electrode current collector 17 in order to reduce the resistance, provide a catalytic effect, and strengthen the bond between the negative electrode active material layer 16 and the negative electrode current collector 17, as with the case of the positive electrode 20.

The negative electrode active material layer 16 is provided on at least one surface of the negative electrode current collector 17. The negative electrode active material layer 16 contains a negative electrode active material, and may contain, as needed, an electron conductive agent, an ion conductive agent, a binder, etc.

In the case where the quinone compound is used as the negative electrode active material, examples of the material that can be used as the positive electrode active material include: lithium-containing metal oxides such as $LiCoO_2$, $LiNiO_2$, and $LiMn_2O_4$; phosphates of transition metals such as lithium iron phosphate ($LiFePO_4$); transition metal oxides such as vanadium pentoxide ($V_2O_5$); activated carbon; and oxidizable/reducible organic compounds. Examples of the oxidizable/reducible organic compound include an organic compound, typified by a tetrathiafulvalene ring, that has a n-conjugated electron cloud in a molecule, and an organic compound, typified by a nitroxyl radical, that has a stable radical in a molecule. As the electron conductive agent, the ion conductive agent, and the binder for the negative electrode active material layer 16, the same materials contained in the positive electrode active material layer 13 can be used.

As the separator 14, for example, a microporous sheet or film having a specific ion permeability, mechanical strength and insulation is used. A woven fabric or a nonwoven fabric also can be used as the separator 14. Various resin materials can be used for the separator 14, but from the viewpoints of durability, shutdown function and safety of the battery 10, polyolefins such as polyethylene and polypropylene are preferably used. The shutdown function is a function to close through holes of a separator when the amount of heat generated by a battery increases significantly, thereby inhibiting permeation of ions therethrough and stopping the battery reaction.

The positive electrode 20, the negative electrode 21, and the separator 14 are impregnated with a non-aqueous electrolyte solution. As the non-aqueous electrolyte solution, a solution obtained by dissolving a salt of a lithium ion and an anion (electrolyte salt) in a glycol diether solvent can be used.

Examples of the anion include a halide anion, a perchlorate anion, a trifluoromethanesulfonate anion, a tetraborofluoride anion, a trifluorophosphorus hexafluoride anion, a trifluoromethanesulfonate anion, a bis(trifluoromethanesulfonyl)imide anion, and a bis(perfluoroethylsulfonyl)imide anion. These anions may be used alone or in combination of two or more. As the supporting salt, a lithium salt composed of a lithium ion and the above-mentioned anion is preferred.

As the solvent, a glycol diether can be used alone, or a mixed solvent of a glycol diether and another non-aqueous solvent also can be used. Examples of the glycol diether that can be used include diglymes (n=2 in the general formula (1): diethylene glycol dimethyl ethers), triglymes (n=3 in the general formula (1): triethylene glycol dimethyl ethers), tetraglymes (n=4 in the general formula (1): tetraethylene glycol dimethyl ethers), and derivatives of these. From the viewpoint of the coordination ability to lithium ions, triglymes and tetraglymes are used preferably, and tetraglymes are used particularly preferably.

In the case where a mixed solvent of a glycol diether and another non-aqueous solvent is used, any of known organic solvents used for lithium ion batteries and non-aqueous electric double layer capacitors can be used as the other non-aqueous solvent. Specific examples of the organic solvent that can be used as the other non-aqueous solvent include ethylene carbonate, propylene carbonate, dimethyl carbonate, diethyl carbonate, methylethyl carbonate, γ-butyrolactone, tetrahydrofuran, dioxolane, sulfolane, dimethylformamide, and acetonitrile. The above organic solvents can be used alone or in combination of two or more as the other non-aqueous solvent.

The solvent component of the non-aqueous electrolyte solution for the battery 10 may consist essentially of the solvent represented by the formula (1). Thus, the effect of reducing the surface charge density of lithium can be obtained sufficiently.

The non-aqueous electrolyte solution contains, for example, 0.8 to 1.5 moles (preferably 0.9 to 1.2 moles) of the solvent represented by the formula (1) per mole of the lithium salt. When the non-aqueous electrolyte solution contains the lithium salt and the glycol diether at such a ratio, the effect of reducing the surface charge density of lithium can be obtained sufficiently. In Examples described below, the molar ratio between the lithium salt and the glycol diether is 1:1. It is considered that when the molar ratio of the glycol diether to the lithium salt is greater than 1, the glycol diether can easily be coordinated to lithium in the electrolyte solution, which may make it possible to obtain the effects of the present invention more reliably.

Another example of the electricity storage device is a capacitor including an electrode of a quinone compound and a counter electrode containing activated carbon.

Another organic compound may be used as the electrode active material instead of the quinone compound or in addition to the quinone compound. Examples of the other organic compound that can be used as the electrode active material include organic sulfur compounds such as sulfide, modified quinone compounds having a cyano group and obtained by substituting a quinone site of a quinone compound by $C(CN)_2$ or $N(CN)$, electrically conductive polymer compounds such as polythiophene, polyaniline, and polypyrrole, and derivatives of these compounds. Two or more of these organic compounds may be used in combination as the positive electrode active material or the negative electrode active material.

EXAMPLES

The examples of the present invention will be described in detail below, but the present invention is not limited to these examples.

Example 1

A coin-type battery was produced by the following method by using an ortho-quinone compound as a positive electrode active material and lithium metal as a negative electrode active material.

(1) Production of Positive Electrode Active Material

A phenanthrenequinone polymer (substance name: poly[(9,10-phenanthrenequinone-3,6-diyl)-co-1,4-phenylene]) was synthesized by reacting 3,6-dibromo-9,10-phenanthrenequinone and benzene-1,4-diboronic acid via the Suzuki-Miyaura coupling reaction according to the following formula (12):

[Chemical Formula 11]

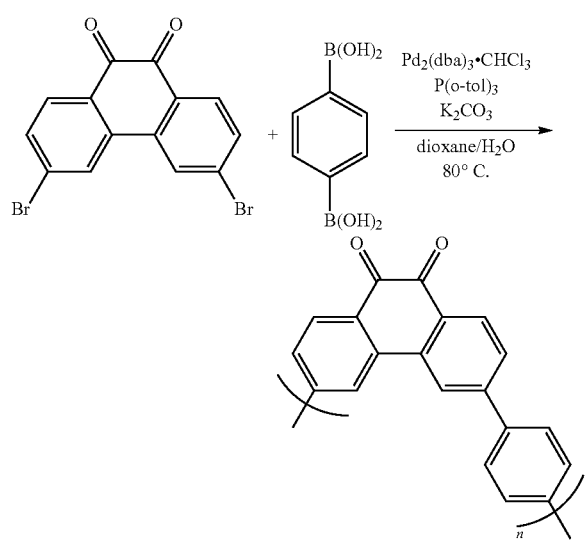

Specifically, first, 3,6-dibromo-9,10-phenanthrenequinone (549 mg, 1.5 mmol) and benzene-1,4-diboronic acid (249 mg, 1.5 mmol) were dissolved in 8.0 ml of dioxane. $Pd_2(dba)_3 \cdot CHCl_3$ (47 mg, 0.045 mmol), 28 mg (0.090 mmol) of tris(o-tolyl)phosphine, 621 mg (4.5 mmol) of potassium carbonate, and 1.0 ml of water were added to the resulting solution. The resulting mixed solution was heated at 80° C. overnight under an argon atmosphere. After completion of the reaction, the reaction solution was cooled to room temperature, and was then filtrated. The resulting solid was washed with water and ethyl acetate and further with chloroform. After vacuum drying, 403 mg (yield 95%) of the phenanthrenequinone polymer was obtained as a deep red solid. The resulting polymer had a weight-average molecular weight of 5700 and a number-average molecular weight of 2800. The average degree of polymerization n calculated based on the weight-average molecular weight was about 20. An infrared absorption spectroscopy analysis was performed thereon to find the following results.

IR (solid): 1669, 1594, 1395, 1312, 1295, 1235 $cm^{-1}$ (2) Production of Positive Electrode A positive electrode was produced using the phenanthrenequinone polymer of the formula (12). First, 60 mg of the phenanthrenequinone polymer was dissolved in 900 mg of N-methyl-2-pyrrolidone (NMP) (Wako Pure Chemical Industries, Ltd.). Next, 160 mg of acetylene black serving as a conductive agent, 40 mg of polyvinylidene fluoride serving as a binder, and 1.1 g of NMP were added to the solution. Thus, a mixed paste was prepared. Next, the mixed paste was applied onto an aluminum foil serving as a positive electrode current collector with a thickness of 20 μm. The coating was dried for 1 hour at a temperature of 80° C. Thus, an electrode sheet with a thickness of about 85 μm was produced. This electrode sheet was punched out into a disc shape with a diameter of 13.5 mm. Thus, the positive electrode was obtained.

(3) Production of Electricity Storage Device

A coin-type battery having the configuration shown in FIG. 1 was produced using the positive electrode produced as described above. First, the disc-shaped positive electrode was placed in a case such that the positive electrode current collector was brought into contact with the inner surface of the case. Next, a porous polyethylene sheet serving as a separator was placed on the positive electrode. Next, a non-aqueous electrolyte solution was poured into the case. As the non-aqueous electrolyte solution, a solution obtained by dissolving lithium bis(trifluoromethanesulfonyl)imide in triethylene glycol dimethyl ether was used. In this non-aqueous electrolyte solution, the concentration of lithium bis(trifluoromethanesulfonyl)imide was 50 mol % and the concentration of triethylene glycol dimethyl ether was 50 mol %.

Then, a negative electrode current collector and a negative electrode active material layer were press-fitted in this order onto the inner surface of a sealing plate. As the negative electrode active material layer, a sheet-like metallic lithium with a thickness of 300 μm was used. As the negative electrode current collector, a stainless steel foil with a thickness of 100 μm was used. In order to adjust the thickness of the electrode, a dish spring was used as needed. The case in which the positive electrode was placed and the sealing plate in which the negative electrode was placed were stacked on each other, with a gasket being fitted around the periphery of the case, so that the negative electrode active material layer was brought into contact with the separator. Then, the case was crimped by a pressing machine. Thus, the coin-type battery with a thickness of 1.6 mm and a diameter of 20 mm was produced.

Example 2

A coin-type battery configured in the same manner as in Example 1 was produced, except that a different non-aqueous electrolyte solution was used. In Example 2, as the non-aqueous electrolyte solution, a solution obtained by dissolving lithium bis(trifluoromethanesulfonyl)imide in tetraethylene glycol dimethyl ether was used. In this non-aqueous electrolyte solution, the concentration of lithium bis(trifluoromethanesulfonyl)imide was 50 mol % and the concentration of tetraethylene glycol dimethyl ether was 50 mol %.

Comparative Example 1

An electricity storage device configured in the same manner as in Example 1 was produced, except that a different non-aqueous electrolyte solution was used. In Comparative Example 1, as the non-aqueous electrolyte solution, a solution obtained by dissolving lithium bis(trifluoromethanesulfonyl)imide at a concentration of 1 mol/L in propylene carbonate was used.

Example 3

A tetraketone polymer (substance name: poly[N-(pyrene-4,5,9,10-tetraone-2-yl)methacrylamide-co-methyl methacrylate]) was synthesized by reacting 2-amino-pyrene-4,5,9,10-tetraone and polymethacryloyl chloride according to the following formula (13):

[Chemical Formula 12]

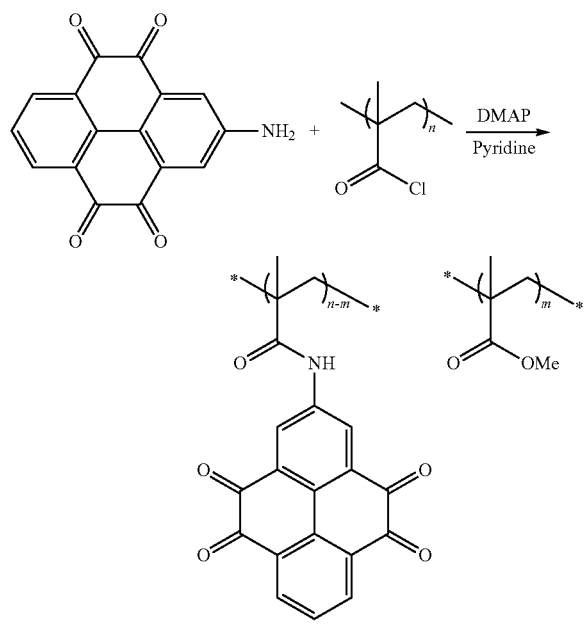

(13)

Specifically, first, 2-amino-pyrene-4,5,9,10-tetraone (150 mg, 0.5 mmol), polymethacryloyl chloride (100 mg), and 4,4'-dimethylamino pyridine (6 mg, 0.05 mmol) were added to dry pyridine (5 mL) and stirred at 60° C. for 12 hours. Then, dry methanol (0.5 mL) was added thereto and stirred at 50° C. for another 10 hours. Thereafter, the reaction solution was cooled to room temperature and poured into methanol (200 mL). The resulting solid was filtered and washed with methanol, and then dried under reduced pressure. The resulting powder was dispersed in a proper amount of N-methylpyrrolidone and stirred overnight. Thereafter, it was re-precipitated using ethanol as a poor solvent. As a result, poly[N-(pyrene-4,5,9,10-tetraone-2-yl)methacrylamide-co-methyl methacrylate] (150 mg, yield 70%) was obtained as an orange solid. A $^1$H NMR analysis, an infrared spectroscopic analysis, and an elemental analysis were performed thereon to find the following results. The introduction ratio of pyrenetetraone was 50% in terms of NMR.

$^1$H NMR (400 MHz, DMSO-$d_6$)·0.6-3.0 (br), 3.56 (bs, OMe), 7.3-8.7 (br, aromatic).

IR (solid): (cm$^{-1}$) 1682, 1431, 1273, 1188.

Elemental analysis: C 65.93, H 3.83, N 3.40

A positive electrode was produced using the tetraketone compound as an electrode active material, and a coin-type battery using this positive electrode was produced in the same manner as in Example 1. The non-aqueous electrolyte solution used in Example 1 was used to produce the coin-type battery of Example 3.

Example 4

A coin-type battery configured in the same manner as in Example 3 was produced, except that a different non-aqueous electrolyte solution was used. In Example 3, as the non-aqueous electrolyte solution, a solution obtained by dissolving lithium bis(trifluoromethanesulfonyl)imide in tetraethylene glycol dimethyl ether was used. In this non-aqueous electrolyte solution, the concentration of lithium bis(trifluoromethanesulfonyl)imide was 50 mol % and the concentration of tetraethylene glycol dimethyl ether was 50 mol %.

Comparative Example 2

A coin-type battery configured in the same manner as in Example 3 was produced, except that a different non-aqueous electrolyte solution was used. In Comparative Example 2, as the non-aqueous electrolyte solution, a solution obtained by dissolving lithium bis(trifluoromethane)sulfonylimide at a concentration of 1 mol/L in propylene carbonate was used.

[Charge-discharge Test]

The coin-type batteries of Examples 1 to 4 and Comparative Examples 1 and 2 were subjected to a charge-discharge test under the following conditions. The charge-discharge was performed at a current equivalent to 0.2 C rate (5-hour rate) with respect to the theoretical capacity of each coin-type battery. The charge-discharge test was conducted at voltages ranging from 2.0 V to 4.0 V for the coin-type batteries of Examples 1 and 2 and Comparative Example 1, at voltages ranging from 1.5 V to 4.0 V for the coin-type batteries of Examples 3 and 4 and Comparative Example 2. The charge-discharge test was started with discharge, and 50 cycles of charge-discharge were performed. The batteries were put in a thermostatic bath at 45° C. for the charge-discharge test. A 5-minute interval was given between discharge and charge and between charge and discharge. The discharge capacity (mAh/g) per gram of the positive electrode active material was calculated from the first discharge capacity of each coin-type battery. The ratio of the 50th discharge capacity to the first discharge capacity (capacity retention rate) was calculated. Table 1 shows the results.

TABLE 1

| | Positive electrode active material | Capacity (mAh/g) Theoretical capacity | Capacity (mAh/g) Discharge capacity | Capacity retention rate (%) |
|---|---|---|---|---|
| Example 1 | Phenanthrenequinone polymer | 186 | 173 | 95 |
| Example 2 | Phenanthrenequinone polymer | 186 | 174 | 96 |
| Com. Example 1 | Phenanthrenequinone polymer | 186 | 175 | 79 |
| Example 3 | Tetraketone polymer | 232 | 218 | 91 |
| Example 4 | Tetraketone polymer | 232 | 218 | 92 |
| Com. Example 2 | Tetraketone polymer | 232 | 219 | 60 |

As shown in Table 1, the batteries of Example 1 and Comparative Examples 1 and 2 exhibited almost the same discharge capacities. The batteries of Examples 3 and 4 and Comparative Example 2 exhibited almost the same discharge capacities. In addition, the batteries of Examples 1 to 4 exhibited higher capacity retention rates than the batteries of Comparative Examples 1 and 2. This means that the batteries of Examples 1 to 4 had excellent cycle characteristics.

The electrolyte solutions used for the batteries of Examples 1 and 2 were different from the electrolyte solution used for the battery of Comparative Example 1. Presumably, the difference in the cycle characteristics is due to the difference in the electrolyte solutions. These batteries in a charged state were disassembled after the charge-discharge test. As a result, no dissolution of the active material into the electrolyte solutions was observed in these batteries. After the disassembly of the batteries, the positive electrodes were washed with ethyl methyl carbonate, followed by vacuum drying. Then, a quantitative analysis of lithium in these positive electrodes was performed. As a result, lithium was detected from the positive electrode of Comparative Example 1. On the other hand, no lithium was detected from the positive electrodes of Examples 1 and 2. It may be concluded from these results that the battery of Comparative Example 1 deteriorated because lithium bonded to the active material was not desorbed therefrom. Presumably, the batteries of Examples 1 and 2 were less susceptible to deterioration and exhibited excellent cycle characteristics because lithium bonded to the active material could be desorbed smoothly therefrom.

An electrode active material having a high theoretical capacity (232 mAh/g) was used in the batteries of Examples 3 and 4 and Comparative Example 2. Also in Examples 3 and 4, the same effects as in Examples 1 and 2 were obtained. The electrolyte solutions used for the batteries of Examples 3 and 4 were different from the electrolyte solution used for the battery of Comparative Example 2. These batteries in a charged state were disassembled after the charge-discharge test. As a result, no dissolution of the active material in the electrolyte solutions was observed in these batteries. After the disassembly of the batteries, the positive electrodes were washed with ethyl methyl carbonate, followed by vacuum drying. Then, a quantitative analysis of lithium in these positive electrodes was performed. As a result, lithium was detected from the positive electrode of Comparative Example 2. On the other hand, no lithium was detected from the positive electrodes of Examples 3 and 4. It may be concluded from these results that the battery of Comparative Example 2 deteriorated because lithium bonded to the active material was not desorbed therefrom. Presumably, the batteries of Examples 3 and 4 were less susceptible to deterioration and exhibited excellent cycle characteristics because lithium bonded to the active material could be desorbed smoothly therefrom.

Next, examples of non-aqueous electrolyte solutions containing solvents other than glycol diether (glyme) are described.

Examples 11 to 18 and Comparative Examples 11 to 13

Non-aqueous electrolyte solutions of Examples 11 to 18 and Comparative Examples 11 to 13 were each prepared by mixing a lithium salt, a glyme solvent, and a chain carbonic ester or a cyclic carbonic ester at a molar ratio shown in parentheses in Table 2 or Table 3. This preparation was performed in dry air having a dew point of −50° C. or lower. As the glyme solvent of Examples, a tetraglyme (tetraethylene glycol dimethyl ether) represented by the above formula (1), in which R and R' at both ends thereof are methyl groups, was used.

[Evaluation of Non-Aqueous Electrolyte Solutions]

For the non-aqueous electrolyte solutions prepared in Examples and Comparative Examples, the oxidation resistance and electric conductivity were evaluated. The evaluation of oxidation resistance was performed by immersing a working electrode, a counter electrode and a reference electrode in each of the non-aqueous electrolyte solutions and scanning the potential of the working electrode from 3 V to 6 V with respect to lithium, at a rate of 1 mV/sec. A potential at which the oxidation current rose during the scanning of the potential in this range was determined as an oxidation potential (V). The oxidation resistance test was performed in dry air having a dew point of −50° C. or lower at 25° C. A platinum electrode was used as the working electrode, and lithium metal was used as the counter electrode and the reference electrode, respectively. The results are shown in the column of "oxidation potential" of Tables 2 and 3. The higher the oxidation potential, the higher the oxidation resistance of the non-aqueous solution.

The electric conductivity was evaluated by measuring the electric conductivity (mS/cm) of each non-aqueous electrolyte solution at 25° C. and −20° C. in dry air having a dew point of −50° C. or lower using a commercially available electric conductivity meter ("CM-30R" by DKK-TOA Corporation). The results are shown in the column of "electric conductivity" of Tables 2 and 3.

TABLE 2

| | Lithium salt | Glyme solvent | Chain carbonic ester | Oxidation potential (V) | Electric conductivity (mS/cm) 25° C. | Electric conductivity (mS/cm) −20° C. |
|---|---|---|---|---|---|---|
| Example 11 | LITFSI (1) | Tetraglyme (1) | EMC (1) | 5.0 | 3.0 | 0.3 |
| Example 12 | LITFSI (1) | Tetraglyme (1) | EMC (3) | 5.0 | 5.3 | 1.5 |

TABLE 2-continued

|  | Lithium salt | Glyme solvent | Chain carbonic ester | Oxidation potential (V) | Electric conductivity (mS/cm) | |
|---|---|---|---|---|---|---|
|  |  |  |  |  | 25° C. | −20° C. |
| Example 13 | LITFSI (1) | Tetraglyme (1) | EMC (5) | 5.0 | 6.0 | 2.0 |
| Example 14 | LITFSI (1) | Tetraglyme (1) | EMC (10) | 5.0 | 4.0 | 1.8 |
| Example 15 | LITFSI (1) | Tetraglyme (1) | — | 5.0 | 2.3 | 0.1 |
| Example 16 | LITFSI (1) | Tetraglyme (4) | — | 4.5 | 2.5 | 0.4 |

*In Table 2, "LITFSI" refers to "lithium bis(trifluoromethylsulfonyl)imide".
*In Table 2, "EMC" refers to "ethyl methyl carbonate".

As shown in Table 2, the oxidation potentials of the non-aqueous electrolyte solutions of Examples 11 to 14 were all 5.0 V. The non-aqueous electrolyte solutions of Examples 11 to 14 exhibited an oxidation potential as high as that of Example 15 and higher than that of Example 16. The non-aqueous electrolyte solutions of Examples 11 to 14 and Example 15 each contained lithium salt and tetraglyme at a molar ratio of 1:1. Therefore, there were very few free tetraglyme molecules that were not coordinated to lithium ions, but almost all tetraglyme molecules were stabilized in the form of complexes with lithium ions. Thus, these non-aqueous electrolyte solutions exhibited such a high oxidation potential. In contrast, the non-aqueous electrolyte solution of Example 16 contained tetraglyme four times as much as lithium salt. Therefore, there were many free tetraglyme molecules that were not coordinated to lithium ions. Presumably, the presence of these free tetraglyme molecules caused a decrease in the oxidation potential of this non-aqueous electrolyte solution.

The non-aqueous electrolyte solutions of Examples 12 to 14 exhibited particularly excellent electric conductivities. The electric conductivities of the non-aqueous electrolyte solutions of Examples 12 to 14 at −20° C. were 15 to 20 times higher than the electric conductivity of the non-aqueous electrolyte solution of Example 15. The non-aqueous electrolyte solutions of Examples 11 to 14 exhibited electric conductivities of 3 to 6 mS/cm at 25° C. and 0.3 to 2.0 mS/cm at −20° C., respectively. The electric conductivities of the non-aqueous electrolyte solutions of Examples 11 to 14 were 1.3 to 2.6 times at 25° C. and 3 to 20 times at −20° C., respectively, higher than those of the non-aqueous electrolyte solution of Example 15. Presumably, this is because the non-aqueous electrolyte solution of Example 15 contained no chain carbonic ester.

These results revealed that the non-aqueous electrolyte solutions of Examples 11 to 14 exhibited both high electric conductivities and excellent oxidation resistance because they contained a lithium salt, a glyme solvent, and a chain carbonic ester.

Examples 14, 17 and 18, and Comparative Examples 11 to 13

Table 3 shows the results of the evaluation of the oxidation resistance and the evaluation of the electric conductivities of the non-aqueous electrolyte solutions of Example 14, Example 17, Example 18 and Comparative Examples 11 to 13. As for Example 14, the data shown in Table 2 is shown also in Table 3.

TABLE 3

|  | Lithium salt | Glyme solvent | Carbonic ester | | Oxidation potential (V) | Electric conductivity (mS/cm) | |
|---|---|---|---|---|---|---|---|
|  |  |  | Chain | Cyclic |  | 25° C. | −20° C. |
| Example 14 | LITFSI (1) | Tetraglyme (1) | EMC (10) | — | 5.0 | 4.0 | 1.8 |
| Example 17 | LITFSI (1) | Tetraglyme (1) | — | PC (10) | 4.6 | 5.2 | 1.3 |
| Example 18 | LITFSI (1) | Tetraglyme (1) | — | GBL (10) | 4.5 | 7.1 | 2.4 |
| Com. Example 11 | LITFSI (1) | — | EMC (10) | — | 5.7 | 2.7 | 1.4 |
| Com. Example 12 | LITFSI (1) | — | — | PC (10) | 5.8 | 4.4 | 1.0 |
| Com. Example 13 | LITFSI (1) | — | — | GBL (10) | 5.8 | 7.9 | 2.8 |

*In Table 3, "PC" refers to "propylene carbonate".
*In Table 3, "GBL" refers to "γ-butyrolactone".

The non-aqueous electrolyte solution of Example 14 is the same as that of Comparative Example 11 except that the former contains a glyme solvent and the latter contains no glyme solvent. The oxidation potential of Example 14 containing the glyme solvent was slightly lower than that of Comparative Example 11. However, the oxidation resistance (5 V) of Example 14 was high enough for 4 V class batteries. The electric conductivities of the non-aqueous electrolyte solution of Example 14 were 1.5 times at 25° C. and 1.3 times at −20° C., respectively, higher than those of the non-aqueous electrolyte solution of Comparative Example 11 containing no glyme solvent. It may be concluded from these results that the introduction of the glyme solvent promotes the dissociation of the lithium salt, resulting in an increase in the ionic conductivity.

The non-aqueous electrolyte solutions of Comparative Examples 12 and 13 exhibited an oxidation potential of 5.8 V. The non-aqueous electrolyte solutions of Examples 17 and 18 containing the glyme solvent in addition to the components of the non-aqueous electrolyte solutions of Comparative Examples 12 and 13 exhibited oxidation potentials of about 4.5 to 4.6 V, which were lower by at least 1 V than those of Comparative Examples 12 and 13. Presumably, this decrease in the oxidation potentials is attributed to the interaction between the glyme solvent and the cyclic carbonic esters. More specifically, since the cyclic carbonic esters contained in the non-aqueous electrolyte solutions of Examples 17 and 18 have high dielectric constants, they broke the complex structure of the lithium salt and the glyme solvent to generate glyme solvent molecules that were not coordinated to lithium ions, resulting in a decrease in the oxidation potentials.

On the other hand, since the chain carbonic ester of Example 14 has a lower dielectric constant than that of the cyclic carbonic esters of Examples 17 and 18, they did not break the complex structure of the lithium salt and the glyme solvent, resulting in no significant decrease in the oxidation potential. The dielectric constants of the non-aqueous electrolyte solutions of Examples 17 and 18 containing the cyclic carbonic esters were higher than those of the non-aqueous electrolyte solutions of Examples 15 and 16 containing no carbonic ester.

These results revealed that the non-aqueous electrolyte solution of Example 14 exhibited both a high electric conductivity and excellent oxidation resistance because it contained the lithium salt, the glyme solvent, and the chain carbonic ester. In Examples 11 to 14, only ethyl methyl carbonate was used as the chain carbonic ester, but the same effects can be obtained even if dimethyl carbonate, diethyl carbonate, or diethyl carbonate in which at least one hydrogen of the ethyl group is substituted by fluorine, chlorine or bromine was used instead.

Example 21

In this example, a coin-type battery was produced by the following method using an ortho-quinone compound as a positive electrode active material and lithium metal as a negative electrode active material. Specifically, the positive electrode was produced in the same manner as in Example 1, except that the compound of the formula (13) was used as the ortho-quinone compound. Next, a coin-type battery was produced in the same manner as in Example 1, except that the electrolyte solution used in Example 12 was used as the non-aqueous electrolyte solution.

Examples 22 to 26 and Comparative Examples 21 and 22

Coin-type batteries of Examples 22 to 26 and Comparative Examples 21 and 22 were produced in the same manner as in Example 21, except that different non-aqueous electrolyte solutions were used. The non-aqueous electrolyte solutions used in Examples 22 to 26 and Comparative Examples 21 and 22 were each prepared by mixing a lithium salt, a glyme solvent, and a chain carbonic ester or a cyclic carbonic ester at a molar ratio shown in parentheses in Table 4 below. As the glyme solvent, a tetraglyme (tetraethylene glycol dimethyl ether) represented by the above formula (1), in which R and R' at both ends thereof are methyl groups, was used.

[Charge-discharge Test]

The coin-type batteries of Examples 21 to 26 and Comparative Examples 21 and 22 were subjected to a charge-discharge test under the following conditions. Specifically, the charge-discharge was performed at a current equivalent to 0.2 C rate (5-hour rate) with respect to the theoretical capacity of each coin-type battery. The voltages ranging from 1.5 V to 4.0 V were set for the test. The charge-discharge test was started with discharge, and 50 cycles of charge-discharge were performed. The batteries were put in a thermostatic bath at 25° C. for the charge-discharge test. A 5-minute interval was given between discharge and charge and between charge and discharge. The discharge capacity (mAh/g) per gram of the positive electrode active material was calculated from the first discharge capacity of each coin-type battery. The ratio of the 50th discharge capacity to the first discharge capacity (capacity retention rate) was calculated. Table 4 below shows these results.

TABLE 4

| | | | Carbonic ester | | First discharge capacity | Capacity retention |
| | Lithium salt | Glyme solvent | Chain | Cyclic | (mAh/g) | rate (%) |
| --- | --- | --- | --- | --- | --- | --- |
| Example 21 | LiTFSI (1) | Tetraglyme (1) | EMC (3) | — | 217 | 90 |
| Example 22 | LiTFSI (1) | Tetraglyme (1) | EMC (5) | — | 218 | 92 |
| Example 23 | LiTFSI (1) | Tetraglyme (1) | EMC (10) | — | 219 | 90 |
| Example 24 | LiTFSI (1) | Tetraglyme (1) | DEC (10) | — | 219 | 90 |
| Example 25 | LiTFSI (1) | Tetraglyme (1) | DMC (10) | — | 218 | 88 |
| Example 26 | LiTFSI (1) | Tetraglyme (1) | — | — | 110 | 98 |
| Com. Example 21 | LiTFSI (1) | — | EMC (10) | — | 219 | 70 |
| Com. Example 22 | LiTFSI (1) | — | — | PC (10) | 219 | 60 |

*In Table 4, "LiTFSI" refers to "lithium bis(trifluoromethylsulfonyl)imide".
*In Table 4, "EMC" refers to "ethyl methyl carbonate".
*In Table 4, "DEC" refers to "diethyl carbonate".
*In Table 4, "DMC" refers to "dimethyl carbonate".
*In Table 4, "PC" refers to "propylene carbonate".

As shown in Table 4, the coin-type batteries of Examples 21 to 25, each in which a chain carbonic ester was added to a glyme solvent, exhibited high performance. Specifically, they exhibited first discharge capacities as high as 217 mAh/g or more and capacity retention rates (cycle characteristics) as high as 88% or more. When the coin-type battery of Example 26 was put in a thermostatic bath at 45° C. and subjected to a charge-discharge test, it exhibited a first discharge capacity of 218 mAh/g, although not shown in Table 4.

The coin-type batteries of Example 23 and Comparative Example 21 and 22 all exhibited a first discharge capacity as high as 219 mAh/g. However, the capacity retention rate of the coin-type battery of Example 23 was higher than those of Comparative Examples 21 and 22. Presumably, this is because the glyme solvent was coordinated to a lithium ion to form a complex and the reversible reactivity of the organic compound was improved.

Industrial Applicability

The non-aqueous electrolyte solution of the present invention contributes to the improvement of the performance of electrochemical devices such as high capacity and high reliability electricity storage devices and capacitors. The electricity storage device of the present invention can be suitably used for applications including: power supplies for transport devices and electronic devices; electricity storage devices for electric load leveling used in combination with electric power generation systems including thermal power generation, wind power generation, and fuel cell power generation systems; power supplies for emergency electricity storage systems for ordinary houses and apartments, midnight electricity storage systems; and uninterruptible power supplies.

The electricity storage device of the present invention is suitable in particular as a power supply for electronic devices. Such electronic devices include portable electronic devices, electric tools, vacuum cleaners, and robots. The electricity storage device of the present invention can be suitably used as a power supply for portable electronic devices, in particular, such as a cellular phone, a mobile device, a personal data assistance (PDA), a notebook computer, a video camera, and a game console.

The invention claimed is:

1. An electricity storage device comprising:
    a first electrode containing, as an active material, a polymer compound that is an organic compound having an ortho-quinone skeleton;
    a second electrode having a polarity opposite to that of the first electrode; and
    a non-aqueous electrolyte solution containing a lithium salt and a solvent represented by the following formula (1):

$$R\text{—}O(CH_2CH_2O)_n\text{—}R' \quad (1)$$

where R and R' are saturated hydrocarbons having the same structure and each having 1 to 5 carbon atoms, and n is 3 or 4,
    wherein the non-aqueous electrolyte solution contains 0.8 to 1.5 moles of the solvent represented by the formula (1) per mole of the lithium salt.

2. The electricity storage device according to claim 1, wherein the non-aqueous electrolyte solution further contains a chain carbonic ester.

3. The electricity storage device according to claim 2, wherein the non-aqueous electrolyte solution contains 1 to 10 moles of the chain carbonic ester per mole of the lithium salt.

4. The electricity storage device according to claim 2, wherein the non-aqueous electrolyte solution contains 3 to 10 moles of the chain carbonic ester per mole of the lithium salt.

5. The electricity storage device according to claim 1, wherein the lithium salt is an imide salt.

6. The electricity storage device according to claim 1, wherein a solvent component of the non-aqueous electrolyte solution consists essentially of the solvent represented by the formula (1).

7. The electricity storage device according to claim 1, wherein the polymer compound is a polymer compound having a 9,10-phenanthrenequinone skeleton in a main chain or a side chain.

8. The electricity storage device according to claim 1, wherein the polymer compound is a polymer compound having a 4,5,9,10-pyrenetetraone skeleton in a main chain or a side chain.

9. The electricity storage device according to claim 1, wherein the non-aqueous electrolyte solution further contains a carbonic ester.

* * * * *